United States Patent
Okamoto et al.

(10) Patent No.: US 12,291,613 B2
(45) Date of Patent: May 6, 2025

(54) WATER-SOLUBLE FILM AND PACKAGE

(71) Applicant: KURARAY CO., LTD., Okayama (JP)

(72) Inventors: Minoru Okamoto, Okayama (JP);
Sayaka Shimizu, Okayama (JP);
Osamu Kazeto, Okayama (JP);
Mitsunori Asada, Okayama (JP)

(73) Assignee: KURARAY CO., LTD., Okayama (JP)

( * ) Notice: Subject to any disclaimer, the term of this patent is extended or adjusted under 35 U.S.C. 154(b) by 888 days.

(21) Appl. No.: 17/360,055

(22) Filed: Jun. 28, 2021

(65) Prior Publication Data
US 2021/0324162 A1    Oct. 21, 2021

Related U.S. Application Data

(63) Continuation of application No. PCT/JP2019/051492, filed on Dec. 27, 2019.

(30) Foreign Application Priority Data

Dec. 28, 2018 (JP) .................................. 2018-248291

(51) Int. Cl.
*C08J 5/18* (2006.01)
*B65D 65/46* (2006.01)
*C08K 5/053* (2006.01)

(52) U.S. Cl.
CPC ................ *C08J 5/18* (2013.01); *B65D 65/46* (2013.01); *C08K 5/053* (2013.01); *C08J 2329/04* (2013.01)

(58) Field of Classification Search
CPC combination set(s) only.
See application file for complete search history.

(56) References Cited

U.S. PATENT DOCUMENTS

| | | | |
|---|---|---|---|
| 4,478,971 A | 10/1984 | Ballard | |
| 7,674,518 B2 | 3/2010 | Hayakawa et al. | |
| 8,927,061 B2 | 1/2015 | Hikasa et al. | |
| 9,908,957 B2 * | 3/2018 | Mori | C08J 5/18 |
| 2003/0114332 A1 * | 6/2003 | Ramcharan | C11D 17/0017 510/297 |
| 2007/0087171 A1 | 4/2007 | Hikasa et al. | |

(Continued)

FOREIGN PATENT DOCUMENTS

| | | |
|---|---|---|
| CA | 3001549 A1 | 10/2017 |
| CN | 1871138 A | 11/2006 |

(Continued)

OTHER PUBLICATIONS

Written opposition on JP Application No. 2020-562508, Patent No. 7240420, dispatched on Oct. 18, 2023—concise explanation in English attached (corresponding to U.S. Appl. No. 17/359,952).

(Continued)

*Primary Examiner* — Peter A Salamon
(74) *Attorney, Agent, or Firm* — Morgan, Lewis & Bockius LLP

(57) ABSTRACT

A water-soluble film is provided that is excellent in film transparency and water solubility and inhibits sticking between the films. A water-soluble film includes a polyvinyl alcohol resin, wherein a crystallite size obtained from an X-ray profile obtained by wide-angle X-ray measurement is from 4.0 to 5.5 nm and a degree of crystallization obtained from the X-ray profile is from 10.0% to 25.0%, and an external haze is from 7.0% to 30.0%.

20 Claims, 2 Drawing Sheets

(56) References Cited

U.S. PATENT DOCUMENTS

| | | |
|---|---|---|
| 2009/0291282 A1 | 11/2009 | Kitamura et al. |
| 2011/0236608 A1 | 9/2011 | Vavassori Bisutti |
| 2016/0002422 A1 | 1/2016 | Hochi et al. |
| 2016/0102279 A1 | 4/2016 | Labeque et al. |
| 2016/0194465 A1 | 7/2016 | Takafuji et al. |
| 2016/0340456 A1 | 11/2016 | Mori et al. |
| 2017/0233539 A1 | 8/2017 | Friedrich et al. |
| 2017/0259975 A1 | 9/2017 | Yonezawa et al. |
| 2017/0298155 A1 | 10/2017 | Takafuji et al. |
| 2017/0355938 A1 | 12/2017 | Lee et al. |
| 2018/0245028 A1 | 8/2018 | Ookubo et al. |
| 2018/0251613 A1 | 9/2018 | Hiura et al. |
| 2020/0063076 A1 | 2/2020 | Hiura |
| 2021/0171882 A1 | 6/2021 | Tanikawa et al. |

FOREIGN PATENT DOCUMENTS

| | | |
|---|---|---|
| CN | 107746467 A | 3/2018 |
| EP | 0347219 A1 | 12/1989 |
| EP | 3348605 A1 | 7/2018 |
| EP | 3348608 A1 | 7/2018 |
| EP | 3677405 A1 | 7/2020 |
| EP | 3904035 A1 | 11/2021 |
| EP | 3904231 A1 | 11/2021 |
| EP | 3904232 A1 | 11/2021 |
| JP | H06-138321 A | 5/1994 |
| JP | H10-296820 A | 11/1998 |
| JP | 2000296529 A | 10/2000 |
| JP | 2001329130 A | 11/2001 |
| JP | 2002-020507 A | 1/2002 |
| JP | 2002-030162 A | 1/2002 |
| JP | 2002020506 A | 1/2002 |
| JP | 2002-241797 A | 8/2002 |
| JP | 2002-347112 A | 12/2002 |
| JP | 2005-194295 A | 7/2005 |
| JP | 2005179390 A | 7/2005 |
| JP | 2010-155453 A | 7/2010 |
| JP | 2014-016649 A | 1/2014 |
| JP | 2015057629 A | 3/2015 |
| JP | WO2015/118978 A1 | 8/2015 |
| JP | 2016060746 A | 4/2016 |
| JP | WO2016/084836 A1 | 6/2016 |
| JP | 2016-150769 A | 8/2016 |
| JP | 2016-222834 A | 12/2016 |
| JP | WO2016/190235 A1 | 12/2016 |
| JP | WO2017/043505 A1 | 3/2017 |
| JP | WO2017/043509 A1 | 3/2017 |
| JP | 2017-078166 A | 4/2017 |
| JP | 2017-095679 A | 6/2017 |
| JP | 2017-110213 A | 6/2017 |
| JP | 2017-114931 A | 6/2017 |
| JP | 2017-115128 A | 6/2017 |
| JP | 2017-119434 A | 7/2017 |
| JP | 2017-119853 A | 7/2017 |
| JP | 2017-217866 A | 12/2017 |
| JP | WO2018/230583 A1 | 12/2018 |
| JP | 2019-044021 A | 3/2019 |
| JP | WO2019/198683 A1 | 10/2019 |
| WO | 2009/075202 A1 | 6/2009 |
| WO | 2013/146147 A1 | 10/2013 |
| WO | 2014/050696 A1 | 4/2014 |
| WO | 2017/043508 A1 | 3/2017 |
| WO | 2017043514 A1 | 3/2017 |
| WO | 2019/044751 A1 | 3/2019 |

OTHER PUBLICATIONS

Notice of reasons for revocation on JP Application No. 2020-562508, Patent No. 7240420, dispatched on Nov. 15, 2023—concise explanation in English attached (corresponding to U.S. Appl. No. 17/359,952).

Trial and Appeal Decision No. 2020-35529, issued on JP Patent No. 2543748.

Office Action issued in the U.S. Appl. No. 17/360,076, dated Feb. 12, 2024.

Office Action issued in the U.S. Appl. No. 17/359,960, dated Feb. 20, 2024.

Office Action issued in the U.S. Appl. No. 17/359,991, dated Feb. 28, 2024.

Office Action issued in the U.S. Appl. No. 17/360,018, dated Mar. 26, 2024.

Office Action issued in the U.S. Appl. No. 17/360,004, dated Mar. 26, 2024.

Extended European Search Report issued in related European Patent Application No. 19901491.1 dated Aug. 18, 2022.

Extended European Search Report issued in related European Patent Application No. 19905634.2 dated Aug. 30, 2022.

Shiga et al., "Pulsed NMR Study of the Structure of Poly(vinyl alcohol)-Poly(sodium acrylate) Composite Hydrogel," Journal of Polymer Science: Part B: Polymer Physics, 32: 85-90 (1994).

Takigawa et al., "Structure and mechanical properties of poly(vinyl alcohol) gels swollen by various solvents," Polymer, 33 (11): 2334-2339 (1992).

Extended European Search Report issued in related European Patent Application No. 19903285.5 dated Aug. 24, 2022.

Extended European Search Report issued in related European Patent Application No. 19905828.0 dated Sep. 14, 2022.

Extended European Search Report issued in related European Patent Application No. 19905635.9 dated Sep. 14, 2022.

Extended European Search Report issued in related European Patent Application No. 19902016.5 dated Aug. 18, 2022.

Extended European Search Report issued in related European Patent Application No. 19901493.7 dated Aug. 24, 2022.

Jang et al., "Plasticizer effect on the melting and crystallization behavior of polyvinyl alcohol," Polymer, 44: 8139-8146 (2003).

Peppas, "Infrared spectroscopy of semicrystalline poly(vinyl alcohol) networks," Die Makromolekulare Chemie, 178 (2): 595-601 (1977) (English abstract only).

Extended European Search Report issued in related European Patent Application No. 19903286.3 dated Aug. 24, 2022.

Extended European Search Report issued in related European Patent Application No. 19905031.1 dated Sep. 1, 2022.

Office Action issued in Japanese Patent Application No. 2020-562512 corresponding to U.S. Appl. No. 17/360,018 dated Jun. 20, 2023.

Office Action issued in Chinese Patent Application No. 201980086856.6 corresponding to U.S. Appl. No. 17/359,960 dated Jun. 21, 2023.

Office Action issued in Chinese Patent Application No. 201980086787.9 corresponding to U.S. Appl. No. 17/360,004 dated Apr. 12, 2023.

Office Action issued in Chinese Patent Application No. 201980086844.3 corresponding to U.S. Appl. No. 17/360,055 dated Jun. 8, 2023.

Office Action issued in U.S. Appl. No. 17/360,040 dated Jul. 7, 2023.

Second Office Action issued in Chinese Patent Application No. 201980086859.X dated Jul. 3, 2023, corresponding to U.S. Appl. No. 17/359,991.

Office Action issued in Japanese Patent Application No. 2020-562508 (corresponding to U.S. Appl. No. 17/359,952) dated Oct. 4, 2022.

Office Action issued in Japanese Patent Application No. 2020-562509 (corresponding to U.S. Appl. No. 17/359,960) dated Oct. 4, 2022.

Office Action issued in Japanese Patent Application No. 2020-562516 (corresponding to U.S. Appl. No. 17/360,098) dated Oct. 4, 2022.

Office Action issued in Japanese Patent Application No. 2020-562510 (corresponding to U.S. Appl. No. 17/359,991) dated Oct. 25, 2022.

Office Action issued in Japanese Patent Application No. 2020-562513 (corresponding to U.S. Appl. No. 17/360,040) dated Nov. 22, 2022.

Office Action issued in Japanese Patent Application No. 2020-562515 (corresponding to U.S. Appl. No. 17/360,076) dated Sep. 13, 2022.

Office Action issued in the U.S. Appl. No. 17/359,960, dated May 29, 2024.

(56) References Cited

OTHER PUBLICATIONS

Office Action issued in related Chinese Patent Application No. 201980086843.9 dated Jul. 25, 2022.
Office Action issued in related Chinese Patent Application No. 201980086787.9 dated Aug. 2, 2022.
Office Action issued in the U.S. Appl. No. 17/360,098, dated Sep. 27, 2023.
Office Action issued in the U.S. Appl. No. 17/360,004, dated Oct. 11, 2023.
Office Action issued in the U.S. Appl. No. 17/360,018, dated Oct. 11, 2023.
Office Action issued in the JP Patent Application No. 2020-562512, dated Nov. 28, 2023 (corresponding to U.S. Appl. No. 17/360,018).
International Search Report issued in related International Patent Application No. PCT/JP2019/051492 dated Mar. 17, 2020.
Notice of Reasons for Refusal issued in Japanese Patent Application No. 2020-562510 corresponding to U.S. Appl. No. 17/359,991 dated Apr. 10, 2023.
Decision of Refusal issued in Japanese Patent Application No. 2020-562511 corresponding to U.S. Appl. No. 17/360,004 dated Mar. 29, 2023.
Office Action issued in Chinese Patent Application No. 201980086859.X corresponding to U.S. Appl. No. 17/359,991 dated Mar. 3, 2023.
Office Action issued in Chinese Patent Application No. 201980086844.3 corresponding to U.S. Appl. No. 17/360,055 dated Mar. 2, 2023.
Office Action issued in Chinese Patent Application No. 201980086857.0 corresponding to U.S. Appl. No. 17/360,076 dated Feb. 18, 2023.
Office Action issued in Chinese Patent Application No. 201980086834.X corresponding to U.S. Appl. No. 17/360,098 dated Feb. 23, 2023.
Office Action issued in Taiwanese Patent Application No. 108148017 corresponding to U.S. Appl. No. 17/360,098 dated Jan. 19, 2023.
Office Action issued in Japanese Patent Application No. 2020-562511 (corresponding to U.S. Appl. No. 17/360,004) dated Jan. 16, 2023.
Office Action issued in Japanese Patent Application No. 2020-562512 (corresponding to U.S. Appl. No. 17/360,018) dated Jan. 16, 2023.
Office Action issued in Chinese Patent Application No. 201980086862.1 (corresponding to U.S. Appl. No. 17/359,952) dated Dec. 5, 2022.
Office Action issued in Chinese Patent Application No. 201980086856.6 (corresponding to U.S. Appl. No. 17/359,960) dated Dec. 27, 2022.
Office Action issued in Chinese Patent Application No. 201980086861.7 (corresponding to U.S. Appl. No. 17/360,040) dated Dec. 7, 2022.
Office Action issued in Chinese Patent Application No. 201980086834.X (corresponding to U.S. Appl. No. 17/360,098) dated Dec. 8, 2022.
Office Action issued in the corresponding U.S. Appl. No. 17/359,952, mailed Sep. 27, 2024.
Office Action issued in the corresponding U.S. Appl. No. 17/360,076, mailed Jul. 17, 2024.
Non-Final Office Action issued in the corresponding U.S. Appl. No. 17/360,076, dated Oct. 15, 2024.

* cited by examiner

WATER-SOLUBLE FILM AND PACKAGE

TECHNICAL FIELD

The present invention relates to a water-soluble film of a polyvinyl alcohol resin that is preferably used for packing various chemicals and the like and a package using the same.

BACKGROUND ART

In the past, taking advantage of the water solubility, water-soluble films have been used in a wide range of fields, including packaging various chemicals, such as liquid detergents, pesticides, and germicides, seed tapes encapsulating seeds, and the like.

For water-soluble films to be used for such an application, polyvinyl alcohol-based resins (hereinafter, may be simply referred to as PVA) are mainly used and films are proposed that have increased water solubility by adding various additives, such as plasticizers, and by using modified polyvinyl alcohol (e.g., refer to PTL 1).

CITATION LIST

Patent Literature

PTL 1: JP 2017-078166 A

SUMMARY OF INVENTION

Technical Problem

In recent years, laundry detergent packs and the like, using a water-soluble film, have been sold and such a water-soluble film is desired to be highly transparent to allow the detergent, which is the packed content, to be seen through from the perspective of appearance visibility. Particularly in recent years, products have been sold in which some kinds of chemical, such as detergents and softeners, in different colors are separately wrapped in one pack and thus such a water-soluble film is increasingly expected to have high transparency to offer excellent visibility inside the package.

Generally, to increase the film transparency, a method is effective that reduces the external haze of the film, in other words, reduces unevenness on the film surface for smoothing. However, particularly in the water-soluble film, a smoother film surface more readily causes sticking between the films during moisture absorption and sometimes causes tears and drawing while unwinding the film roll and rupture and content leakage while storing the packs due to sticking between the packs. When the sticking is inhibited by increasing the degree of crystallization by heat treatment of the film and the like, good water solubility may be impaired. Accordingly, with the techniques in the past, it is difficult to achieve both the film transparency and the sticking between the films and there are limitations on the development of a film capable of satisfying the increasingly expected performance.

It is an object of the present invention to provide a water-soluble film that is excellent in film transparency and water solubility and sticking between the films is inhibited.

Solution to Problem

As a result of an intensive examination, the present inventors have found that the above problems were probably achieved by controlling, to specific ranges, a degree of crystallization, a crystallite size, and an external haze in a water-soluble film, and they made further investigation based on the findings to complete the present invention.

That is, the present invention relates to [1] through [7] below.

[1] A water-soluble film including a polyvinyl alcohol resin, wherein
a crystallite size obtained from an X-ray profile obtained by wide-angle X-ray measurement is from 4.0 to 5.5 nm and a degree of crystallization obtained from the X-ray profile is from 10.0% to 25.0%, and an external haze is from 7.0% to 30.0%.

[2] The water-soluble film according to [1], wherein a total haze is 55.0% or less.

[3] The water-soluble film according to [2], wherein an internal haze is 35.0% or less.

[4] The water-soluble film according to any one of [1] through [3], further comprising a plasticizer, wherein a content of the plasticizer is from 8 to 35 parts by mass based on 100 parts by mass of the polyvinyl alcohol resin.

[5] A package including: the water-soluble film according to any one of [1] through [4] and a chemical contained in the water-soluble film.

[6] The package according to [5], wherein the chemical is a pesticide, a detergent, or a germicide.

[7] The package according to [5] or [6], wherein the chemical is in a liquid form.

Advantageous Effects of Invention

According to the present invention, it is possible to provide a water-soluble PVA film that is excellent in solubility in water and film is transparent and sticking between the films is inhibited, and a package using the same.

DESCRIPTION OF EMBODIMENTS

Figure 1:
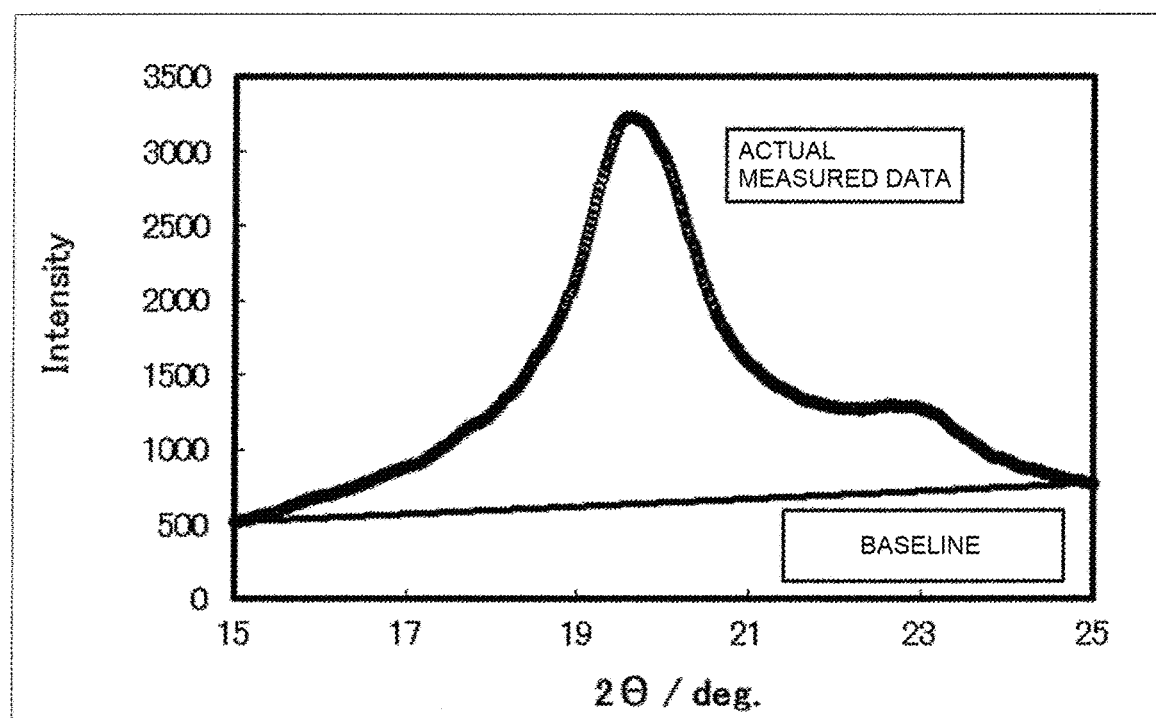
FIG. 1 is a schematic representation of actual measured data obtained by an X-ray profile.

The present invention is specifically described below.

In general, film transparency can be controlled by adjusting a haze value. The haze includes an external haze indicating a degree of blurred vision of a film due to the light scattering on the film surface caused by unevenness on the material surface and an internal haze indicating a degree of blurred vision of a film due to the light scattering inside the film caused by the composition of the material itself and the state of phase separation. The sum of them is the total haze. To increase the transparency, a method is employed that reduces the total haze, that is, reduces the external haze, the internal haze, or both.

As described above, the film surface may be smoothed to reduce the external haze. However, in terms of a PVA film having excellent water solubility, a smoother film surface causes an increase in the contact area between films in a film roll and the like, and thus is likely to cause sticking between the films when the film absorbs moisture. It results in readily causing tears and drawing while unwinding the film roll, rupture and content leakage while storing the packs due to sticking between packages, and the like. The reduction in the external haze by smoothing the film thus has a limit, and in the present invention, the external haze has to be 7.0% or more. The external haze is preferably 8.0% or more, more preferably 9.0% or more, even more preferably 10.0% or more, and particularly preferably 11.0% or more.

Since an excessively high external haze causes difficulty in securing the film transparency, in the present invention, it has to be 30.0% or less. The external haze is preferably 27.0% or less, more preferably 24.0% or less, even more preferably 21.0% or less, and particularly preferably 19.0% or less.

Examples of the method of adjusting the external haze include a method that contacts the film with an emboss roll, a method that provides unevenness on the surface of a metal roll or a belt used for film formation and transfers it when contacted by the film, a method that applies inorganic or organic microparticles on the film surface, a method that mixes inorganic or organic microparticles in a film forming stock solution of the film, and the like.

In the case of using the inorganic or organic microparticles, microparticles having a refractive index close to that of PVA is preferably used to inhibit the increase in the internal haze.

Meanwhile, the internal haze is generally recognized that a larger size of the crystallite, such as a spherulite, tends to cause a larger internal haze (e.g., WO 2018/003884). The internal haze thus has to be reduced by reducing the crystallite size to reduce the total haze while providing the unevenness on the film surface to the extent of allowing inhibition of sticking, that is, providing the external haze of a certain value or more.

However, the crystallite size and the degree of crystallization are correlated to each other, and thus reduction in the crystallite size turns out to reduce the degree of crystallization, and as a result, the water solubility increases and the sticking between the films is likely to be facilitated. With the techniques in the past, it thus used to be difficult to inhibit the sticking between the films while securing high transparency by reducing the crystallite size.

In the present invention, a water-soluble film that is capable of exhibiting film transparency and inhibition of the sticking between the films has come to be invented by controlling the correlation between the crystallite size and the degree of crystallization to secure an expected degree of crystallization even when the crystallite size is small.

Wide-Angle X-Ray Measurement

The water-soluble film of the present invention has a crystallite size obtained from an X-ray profile obtained by wide-angle X-ray measurement from 4.0 to 5.5 nm and a degree of crystallization obtained from the X-ray profile from 10.0% to 25.0%.

In this context, the wide-angle X-ray measurement is based on the measurement principle to analyze diffraction caused as a result of, when a sample is irradiated with X-ray, scattering and interference of the X-ray by electrons around the atom. Use of the diffraction information allows a degree of crystallization, a crystallite size, and the like to be recognized.

When X-ray with a wavelength equivalent to the interatomic distance (from 0.5 Å to 3 Å) is incident on a substance with regularly arrayed atoms, the X-ray scatters due to the electrons belonging to each atom. The scattered X-rays interfere with each other and reinforce each other in a specific direction. According to the Bragg equation, when d denotes a lattice distance, $\theta$ denotes a Bragg angle, and $\lambda$ denotes a wavelength of the X-ray, the diffracted X-rays are observed only in directions satisfying $2d \cdot \sin \theta = n\lambda$.

In the PVA film, it is recognized that diffraction peaks derived from the (101) plane and the (200) plane appear around $2\theta$=approximately 20°. In this embodiment, from these peaks, the degree of crystallization and the crystallite size are obtained.

Calculation of Degree of Crystallization

Baseline Correction

Figure 2:
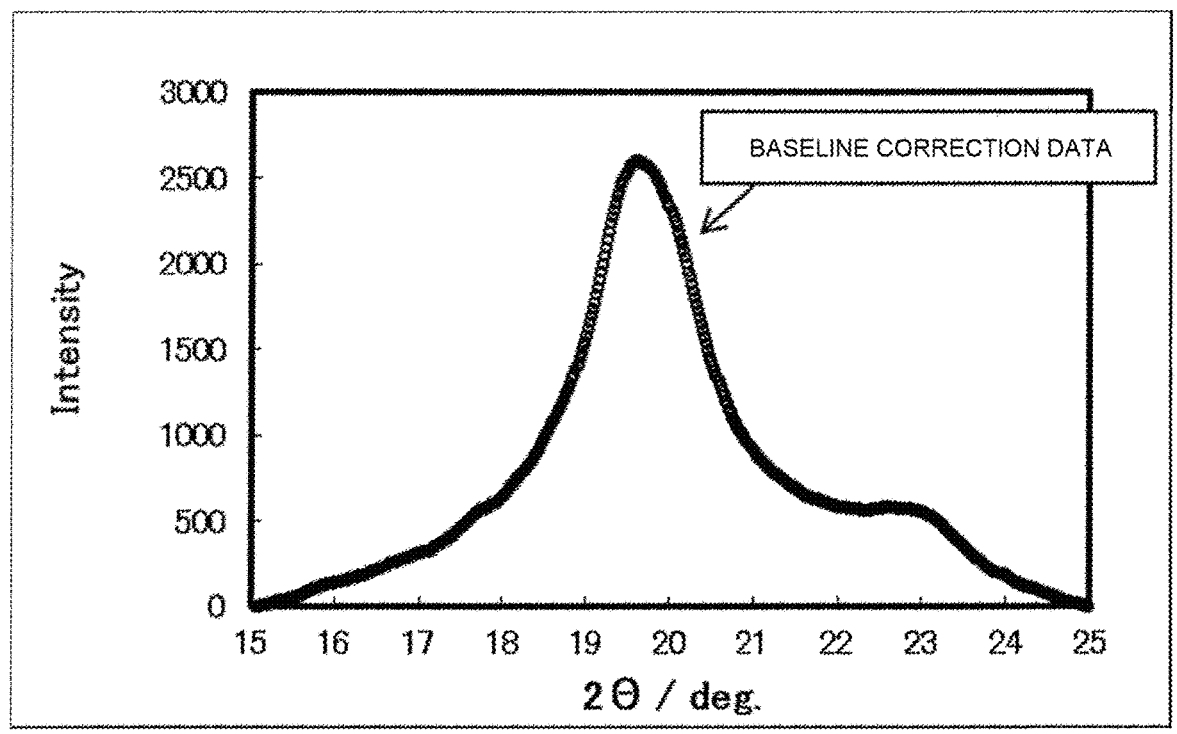
FIG. 2 is a schematic representation of correction based on a baseline drawn in FIG. 1.

In the X-ray profile result, the values at $2\theta=15°$ and $25°$ are connected with a straight line to provide a baseline (FIG. 1). Based on the newly set baseline, the difference between the actual measured data and the baseline is plotted again on the new intensity (Intensity on the ordinates) as $2\theta$-Intensity (FIG. 2).

Fitting of Amorphous Peak

To the profile data after baseline correction (FIG. 2), an amorphous peak is fit by an approximate expression below.

$$f(x)=a \cdot \exp(-\{(x-b)/c\}^2)$$

In the formula, a: peak height, b: peak top position, and c: half width.

Figure 3:
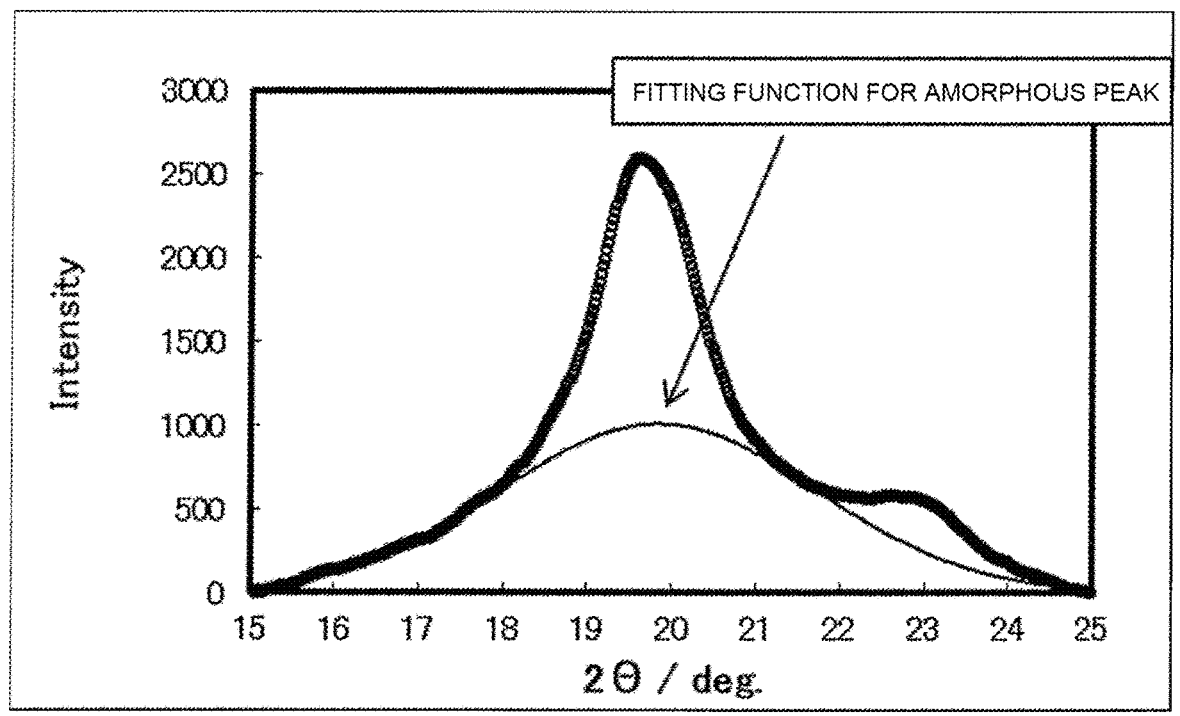
FIG. 3 is a schematic representation of fitting an amorphous portion by an approximate expression.

At this point, it is further fit by the method of least squares to minimize the deviation between $2\theta=15°$ through 17.6° and 21° through 21.6°. The peak top position ($2\theta$) of the fitting function in this process is set on the (101) plane, in other words, around 20° (FIG. 3). The peak area of this fitting function is defined as an amorphous amount (A).

Fitting of Crystal Peaks

Figure 4:
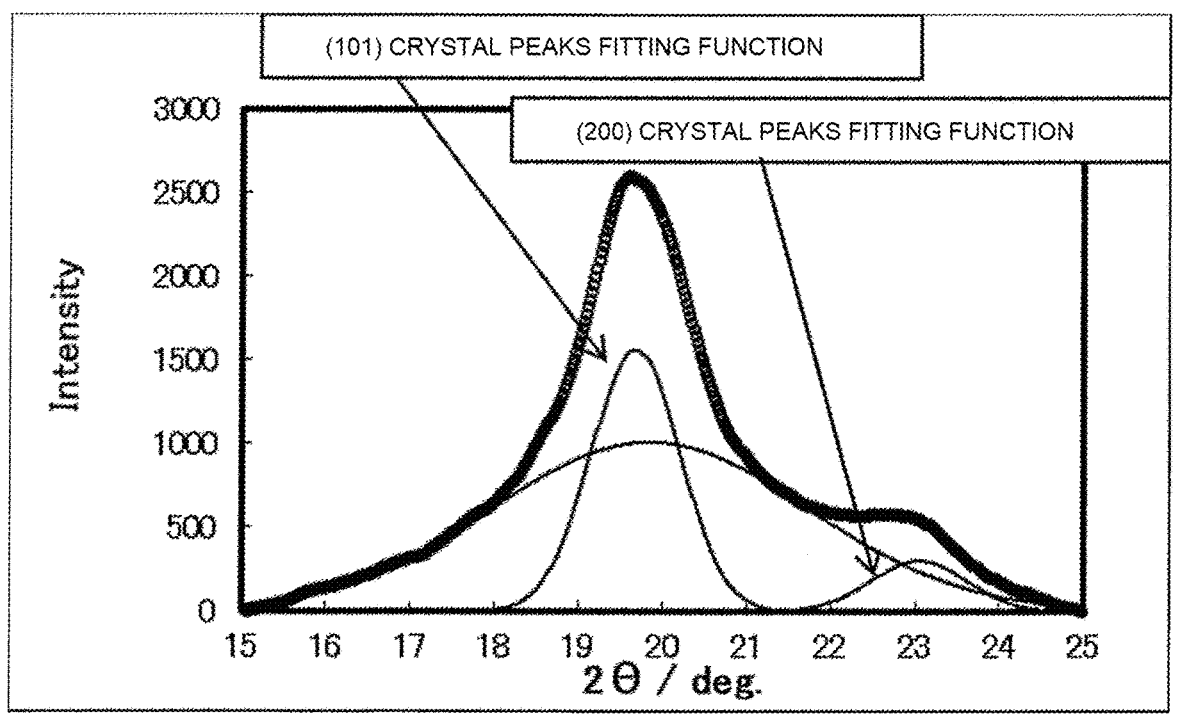
FIG. 4 is a schematic representation of fitting a crystal portion by an approximate expression.

Similarly, the peaks of the profile data after baseline correction (FIG. 2) on the (101) plane and the (200) plane are also fit by the same function as above. In this process, the peak top on the (101) plane is set around 20° and the peak top on the (200) plane around 23°. They are further fit by the method of least squares to minimize the difference between the data after baseline correction and the sum of all the fitting functions including the fitting function for the amorphous peak obtained earlier (FIG. 4). The peak areas of these fitting functions are defined as amounts of crystals (B) and (C), respectively.

Calculation of Degree of Crystallization

What is obtained from the amorphous and crystal area values by a formula below is defined as a degree of crystallization.

$$\text{Degree of Crystallization (\%)}=\{(B)+(C)\}/\{(A)+(B)+(C)\} \times 100$$

Calculation of Crystallite Size

The value calculated from a half width of the fitting function derived from the crystal peak of the (200) plane above using the Scherrer equation (Scherrer constant K=0.94) is defined as a crystallite size.

$$\text{Crystallite Size } D \text{ (nm)}=K\lambda/\omega \cos \theta$$

In the present invention, the film has a crystallite size from 4.0 to 5.5 nm. A crystallite size of more than 5.5 nm tends to cause an increase in the internal haze of the film and impairment of the film transparency. Meanwhile, a crystallite size of less than 4.0 nm on the contrary facilitates dissolution of the crystal, and thus facilitates the sticking between the films. The upper limit of the crystallite size is preferably 5.0 nm or less and more preferably 4.8 nm or less. The lower limit of the crystallite size is preferably 4.3 nm or more and more preferably 4.5 nm or more.

In the present invention, the film has a degree of crystallization from 10.0% to 25.0%. A degree of crystallization of more than 25.0% causes insufficient water solubility of the film and is likely to produce undissolved residues. Meanwhile, a degree of crystallization of less than 10.0% facilitates crystal dissolution and is thus likely to cause sticking between the films. The upper limit of the degree of crystallization is preferably 23.0% or less and more preferably 21.0% or less. The lower limit of the degree of crystallization is preferably 13.0% or more and more preferably 15.0% or more.

In the present invention, from the perspective of transparency, the internal haze of the film is preferably 35.0% or less. An internal haze of the film of more than 35.0% has a risk of not securing sufficient transparency of the film. The internal haze of the film is more preferably 33.0% or less and even more preferably 31.0% or less.

In the present invention, it is important to control the crystallite size and the degree of crystallization in the above ranges. Examples of the control method include: a method that adjusts a kind (degree of saponification, amount of modification, mixing ratio of unmodified PVA/modified PVA, etc.) of the polyvinyl alcohol resin; a method that adjusts an amount of a plasticizer to be added; a method that adjusts film production conditions (roll temperature, heat treatment conditions, number and pore size of filter, etc.); a method that adds inorganic particles and the like to be the a nucleating agent; and adjustment methods in combination thereof.

In the present invention, the total haze of the film is preferably 55.0% or less, more preferably 53.0% or less, even more preferably 50.0% or less, and particularly preferably 48.0% or less.

Polyvinyl Alcohol Resin

The water-soluble film of the present invention contains a polyvinyl alcohol resin. As the PVA, it is possible to use a polymer produced by saponifying a vinyl ester polymer obtained by polymerizing a vinyl ester monomer. Examples of the vinyl ester monomer include vinyl formate, vinyl acetate, vinyl propionate, vinyl valerate, vinyl laurate, vinyl stearate, vinyl benzoate, vinyl pivalate, vinyl versatate, and the like. Among them, vinyl acetate is preferred.

The vinyl ester polymer is preferably a polymer obtained using only one or more kinds of vinyl ester monomer as the monomer and more preferably a polymer obtained using only one kind of vinyl ester monomer as the monomer, and it may be a copolymer of one or more kinds of vinyl ester monomer and another monomer copolymerizable therewith.

Examples of such another monomer copolymerizable with the vinyl ester monomer include: ethylene; olefins having a carbon number from 3 to 30, such as propylene, 1-butene, and isobutene; acrylic acid and salts thereof; acrylic esters, such as methyl acrylate, ethyl acrylate, n-propyl acrylate, i-propyl acrylate, n-butyl acrylate, i-butyl acrylate, t-butyl acrylate, 2-ethylhexyl acrylate, dodecyl acrylate, and octadecyl acrylate; methacrylic acid and salts thereof; methacrylic esters, such as methyl methacrylate, ethyl methacrylate, n-propyl methacrylate, i-propyl methacrylate, n-butyl methacrylate, i-butyl methacrylate, t-butyl methacrylate, 2-ethylhexyl methacrylate, dodecyl methacrylate, and octadecyl methacrylate; acrylamide derivatives, such as acrylamide, N-methylacrylamide, N-ethylacrylamide, N,N-dimethylacrylamide, diacetone acrylamide, acrylamidopropanesulfonic acid and salts thereof, acrylamide propyldimethylamine and salts thereof, and N-methylolacrylamide and derivatives thereof; methacrylamide derivatives, such as methacrylamide, N-methylmethacrylamide, N-ethylmethacrylamide, methacrylamidopropanesulfonic acid and salts thereof, methacrylamide propyldimethylamine and salts thereof, and N-methylolmethacrylamide and derivatives thereof; N-vinylamides, such as N-vinylformamide, N-vinylacetamide, and N-vinylpyrrolidone; vinyl ethers, such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether, and stearyl vinyl ether; vinyl cyanides, such as acrylonitrile and methacrylonitrile; vinyl halides, such as vinyl chloride, vinylidene chloride, vinyl fluoride, and vinylidene fluoride; allyl compounds, such as allyl acetate and allyl chloride; maleic acid and salts, esters, and acid anhydrides thereof; itaconic acid and salts, esters, and acid anhydrides thereof; vinylsilyl compounds, such as vinyltrimethoxysilane; isopropenyl acetate; and the like. The vinyl ester polymer may have a structural unit derived from one or more kinds of such another monomer.

From the perspective of water solubility and film strength, a ratio of the structural unit derived from such another monomer to the vinyl ester polymer is preferably 15 mol % or less based on the number of moles of the total structural units constituting the vinyl ester polymer and more preferably 5 mol % or less.

The degree of polymerization of the PVA is not particularly limited, and the lower limit of the degree of polymerization is preferably 200 or more from the perspective of the film strength, more preferably 300 or more, and even more preferably 500 or more. Meanwhile, the upper limit of the degree of polymerization is preferably 8,000 or less from the perspective of productivity of the PVA, productivity of the water-soluble film, and the like, more preferably 5,000 or less, and even more preferably 3,000 or less. In this context, the degree of polymerization means an average degree of polymerization measured in accordance with the description of JIS K6726-1994, and is obtained by the following formula from the limiting viscosity [η] (unit: deciliter/g) measured, after resaponifying and purifying the PVA, in water at 30° C.

$$\text{Degree of Polymerization } Po=([\eta]\times10^4/8.29)^{(1/0.62)}$$

In the present invention, the degree of saponification of the PVA is preferably from 64 to 97 mol %. Adjustment of the degree of saponification in this range facilitates achievement of both the water solubility and the physical properties of the film. The lower limit of the degree of saponification is more preferably 70 mol % or more and even more preferably 75 mol % or more. Meanwhile, the upper limit of the degree of saponification is more preferably 91 mol % or less, even more preferably 90 mol % or less. In this context, the degree of saponification of the PVA-based polymer means a ratio (mol %) indicating the number of moles of the vinyl alcohol units based on the total number of moles of the structural units (typically, vinyl ester-based monomer units) that may be converted to vinyl alcohol units by saponification and the vinyl alcohol units in the PVA-based polymer. The degree of saponification of the PVA-based polymer may be measured in accordance with the description of JIS K6726-1994.

The water-soluble PVA film in the present invention may singly use one kind of PVA as the PVA or may use by blending two or more kinds of PVA having a degree of polymerization, a degree of saponification, a degree of modification, or the like different from each other.

In the present invention, the upper limit of the PVA content in the PVA film is preferably 100 mass % or less. Meanwhile, the lower limit of the PVA content is preferably 50 mass % or more, more preferably 80 mass % or more, and even more preferably 85 mass % or more.

Plasticizer

In the state of containing no plasticizer, PVA films are rigid compared with other plastic films and sometimes have problems of the mechanical properties, such as impact strength, processability during fabrication, and the like. To prevent these problems, the water-soluble film of the present invention preferably contains a plasticizer.

Examples of preferred plasticizers include polyhydric alcohols, and specific examples include polyhydric alcohols, such as ethylene glycol, glycerin, diglycerin, propylene glycol, diethylene glycol, triethylene glycol, tetraethylene glycol, trimethylolpropane, and sorbitol, and the like. One kind of these plasticizers may be singly used or two or more kinds of them may be used together. Among these plasticizers, from the perspective of not readily bleeding out on a surface of the film and the like, ethylene glycol or glycerin are preferred and glycerin is more preferred.

Adjustment of the amount of the plasticizer to be contained in the PVA film allows adjustment of the crystallite size and the degree of crystallization. Although depending on the primary structure of the PVA molecular chain, a PVA film containing a small amount of the plasticizer generally facilitates proceedings of the crystallization by heat treatment compared with PVA films containing no plasticizer. This is assumed to be because the PVA molecules are facilitated to move and thus facilitated to form a crystal structure, which is energetically more stable. In contrast, a PVA film containing an excessive amount of the plasticizer on the contrary inhibits proceedings of crystallization. This is assumed to be because the amount of the plasticizer interacting with the hydroxyl groups in the PVA molecules is large to cause reduction in the interaction between the PVA molecules. From the perspective of regulating the degree of crystallization and the crystallite size of the film thus obtained in appropriate ranges, the content of the plasticizer is preferably from 8 to 35 parts by mass based on 100 parts by mass of the PVA. A content of the plasticizer of both less than 8 parts by mass and more than 35 parts by mass based on 100 parts by mass of the PVA has a risk of causing a too small degree of crystallization, too small crystallite size, or both being too small. The content of the plasticizer based on 100 parts by mass of the PVA is more preferably from 10 to 30 parts by mass and even more preferably from 15 to 25 parts by mass.

Starch/Water-Soluble Polymer

For the purpose of imparting mechanical strength to the PVA film, maintaining the moisture resistance for handling the film, regulating the rate of flexibilization due to water absorption during the dissolution of the film, or the like, the film of the present invention may contain starch and/or a water-soluble polymer other than PVA.

Examples of the starch include: natural starches, such as corn starch, potato starch, sweet potato starch, wheat starch, rice starch, tapioca starch, and sago starch; processed starches subjected to etherification, esterification, oxidation, and the like; and the like, and processed starches are particularly preferred.

The content of the starch in the PVA film is preferably 15 parts by mass or less based on 100 parts by mass of the PVA and more preferably 10 parts by mass or less. A content of the starch of more than 15 parts by mass has a risk of worsening the processability.

Examples of the water-soluble polymer other than PVA include dextrin, gelatin, glue, casein, shellac, gum arabic, polyacrylic acid amide, sodium polyacrylate, polyvinyl methyl ether, copolymers of methyl vinyl ether and maleic anhydride, copolymers of vinyl acetate and itaconic acid, polyvinylpyrrolidone, cellulose, acetylcellulose, acetylbutylcellulose, carboxymethylcellulose, methylcellulose, ethylcellulose, hydroxyethylcellulose, sodium alginate, and the like.

The content of the water-soluble polymer other than PVA in the PVA film is preferably 15 parts by mass or less based on 100 parts by mass of the PVA and more preferably 10 parts by mass or less. A content of the water-soluble polymer other than PVA of more than 15 parts by mass has a risk of causing insufficient water solubility of the film.

Surfactant

In the present invention, the PVA film preferably contains a surfactant from the perspective of improving the handleability, the releasability of the PVA film from the apparatus for film formation during production, reduction in the film surface irregularities, and the like. The kind of the surfactant is not particularly limited and examples include anionic surfactants, nonionic surfactants, and the like.

Examples of such an anionic surfactant include: carboxylic acid-based surfactants, such as potassium laurate; sulfuric ester-based surfactants, such as octyl sulfate; sulfonic acid-based surfactants, such as dodecylbenzenesulfonate; and the like.

Examples of such a nonionic surfactant include: alkyl ether-based surfactants, such as polyoxyethylene lauryl ether and polyoxyethylene oleyl ether; alkylphenyl ether-based surfactants, such as polyoxyethylene octylphenyl ether; alkyl ester-based surfactants, such as polyoxyethylene laurate; alkylamine-based surfactants, such as polyoxyethylene laurylamino ether; alkylamide-based surfactants, such as polyoxyethylene lauric acid amide; polypropylene glycol ether-based surfactants, such as polyoxyethylene polyoxypropylene ether; alkanolamide-based surfactants, such as lauric acid diethanolamide and oleic acid diethanolamide; allyl phenyl ether-based surfactants, such as polyoxyalkylene allyl phenyl ether; and the like.

One kind of the surfactants may be singly used or two or more kinds of them may be used together. Among these surfactants, due to an excellent effect of reducing film surface irregularities during formation and the like, nonionic surfactants are preferred, and in particular alkanolamide-based surfactants are more preferred, and dialkanolamide (e.g., diethanolamide, etc.) of aliphatic carboxylic acid (e.g., saturated or unsaturated aliphatic carboxylic acid having a carbon number from 8 to 30, etc.) is even more preferred.

The content of the surfactant in the PVA film is preferably 0.01 part by mass or more based on 100 parts by mass of the PVA, more preferably 0.02 parts by mass or more, and even more preferably 0.05 parts by mass or more. Meanwhile, the upper limit of the content of the surfactant is preferably 10 parts by mass or less, more preferably 1 part by mass or less, even more preferably 0.5 parts by mass or less, and particularly preferably 0.3 parts by mass or less. A content of the surfactant of less than 0.02 parts by mass causes poor releasability of the PVA film from the apparatus for film formation during production or is likely to cause problems of blocking between the films and the like. Meanwhile, a content of the surfactant of more than 1 part by mass is likely to cause problems of bleeding out of the surfactant on a film surface, deterioration of the appearance of the film due to aggregation of the surfactant, and the like.

Filler

The PVA film of the present invention may contain a filler without impairing the effects of the present invention. Examples of the filler include: inorganic microparticles, such as talc, silica, titanium dioxide, calcium carbonate, carbon black, glass fiber, mica, and wollastonite; and organic microparticles, such as acrylic- and styrene-based polymer microparticles and the like. One kind of the fillers may be singly used or two or more kinds of them may be used together. Among them, at least one selected from the group consisting of talc, silica, titanium dioxide, and calcium carbonate is preferred from the perspective of the dispersibility in the PVA-based polymer, the prices, the availability, the film appearance, and the like. The content of the filler is preferably from 0.1 to 8 parts by mass based on 100 parts by mass of the PVA and more preferably from 0.5 to 5 parts by mass.

Other Components

In addition to the plasticizer, the starch, the water-soluble polymer other than PVA, the surfactant, and fillers, without impairing the effects of the present invention, the PVA film of the present invention may contain components, such as moisture, antioxidants, ultraviolet absorbers, lubricants, cross-linking agents, colorants, antiseptics, mildewcides, and other polymer compounds. The ratio of the summed mass of the respective mass of the PVA, the plasticizer, the starch, the water-soluble polymer other than PVA, and the surfactant to the total mass of the PVA film of the present invention is preferably in a range from 60 to 100 mass %, more preferably in a range from 80 to 100 mass %, and even more preferably in a range from 90 to 100 mass %.

Water-Soluble Film

Complete dissolution time of the water-soluble film of the present invention immersed immersed in deionized water at 10° C. is preferably 150 seconds or less. The complete dissolution time of 150 seconds or less allows preferred use as a film for packaging chemicals and the like. The complete dissolution time is more preferably 90 seconds or less, even more preferably 60 seconds or less, and particularly preferably 45 seconds or less. Meanwhile, the lower limit of the complete dissolution time is preferably, but not particularly limited to, 5 seconds or more, more preferably 10 seconds or more, even more preferably 15 seconds or more, and particularly preferably 20 seconds or more because a water-soluble film having too short complete dissolution time tends to cause problems of blocking between the films due to moisture absorption in the atmosphere, reduction in film strength, and the like.

The thickness of the water-soluble film of the present invention is preferably, but not particularly limited to, 200 μm or less, more preferably 150 μm or less, even more preferably 100 μm or less, and particularly preferably 50 μm or less because a too large thickness tends to cause worsening of fabricability. Because a too small thickness has a risk of causing a problem in the mechanical strength of the water-soluble film, the thickness is preferably 5 μm or more, more preferably 10 μm or more, even more preferably 15 μm or more, and particularly preferably 20 μm or more. It should be noted that the thickness of the water-soluble film may be obtained as an average value of thicknesses measured at ten arbitrary spots (e.g., ten arbitrary spots on a straight line in the longitudinal direction of the PVA film).

Method of Producing Water-Soluble Film

A method of forming the water-soluble film in the present invention is not particularly limited and may be an arbitrary method, such as a film formation method where a solvent, additives, and the like are added to PVA and homogenized to obtain a film forming stock solution to be used in casting film formation, wet film formation (discharge into a poor solvent), dry/wet film formation, gel film formation (a method where the film forming stock solution is temporarily cooled to form a gel and then the solvent is extracted and removed to obtain a PVA-based polymer film), and combination thereof, melt extrusion film formation where the above film forming stock solution thus obtained is extruded from a T die or the like using an extruder or the like, inflation molding, and the like. Among them, casting film formation or melt extrusion film formation is preferred for allowing a homogeneous PVA film to be productively obtained. For adjustment of the crystallite size, a nucleating agent to be a crystalline nucleus is contained in the resin stock solution in advance to allow adjustment of the crystallite size, leading to adjustment of the haze. Convenient methods of controlling the nucleating agent content include: adjustment of the amount of the microparticles of PVA and the like, which can be the nucleating agent, before film formation with the film stock solution and such adjustment may be controlled by the pore size or the number of the filter(s) set up to be used for filtration; and use of inorganic particles and the like as additives. A description is given below to casting film formation or melt extrusion film formation of the water-soluble film.

In a case of forming the water-soluble film by casting film formation or melt extrusion film formation, the above film forming stock solution is casted in the form of film on a support, such as a metal roll and a metal belt and heated to remove the solvent and thus solidified to be formed into a film. The solidified film is released from the support, dried as needed by a drying roll, a drying furnace, and the like, and further heat treated as needed to be wound and thus allowed to be produced into a long water-soluble film in a roll.

While the PVA film casted on the support is dried by heating on the support and in the following drying process, crystallization proceeds. The crystallization of the PVA does not proceed while the moisture content in the PVA film is excessively high due to the weak interaction between the PVA molecules, whereas it is less likely to proceed when the moisture content is excessively low due to the reduction in the mobility of the PVA molecular chain. Accordingly, heating at an appropriate moisture content in which the crystallization of the PVA readily proceeds causes an increase in the mobility of the PVA molecular chain and in the rate of crystallization, resulting in an increase in the degree of crystallization of the PVA film.

Meanwhile, the crystallite size generally tends to be larger with a higher degree of crystallization but is not determined only by that, and as the above description, also depends on the number of microliter produced in the initial crystallization and microparticles, such as the nucleating agent, and thus it is possible to independently adjust the degree of crystallization and the crystallite size.

The concentration of volatile components (concentration of the volatile components, such as the solvent removed by volatilization and evaporation during film formation and the like) in the film forming stock solution used for formation of the PVA film of the present invention is preferably in a range from 50 to 90 mass % and more preferably in a range from 55 to 80 mass %. A concentration of volatile components of less than 50 mass % causes an increase in the viscosity of the film forming stock solution and sometimes causes difficulty in film formation. Meanwhile, a concentration of volatile components of more than 90 mass % causes a decrease in the viscosity and is likely to impair uniformity in the thickness of the film to be obtained. Moreover, since a higher concentration of volatile components and higher mobility of the PVA molecules are likely to cause the crystallization to proceed on the support, it tends to be difficult to balance the degree of crystallization and the crystallite size.

In this context, a "ratio of volatile components in the film forming stock solution" herein means a ratio of volatile components obtained by the following formula.

Ratio of Volatile Components in Film Forming Stock Solution (mass %)={(Wa−Wb)/Wa}×100

(In the formula, Wa denotes the mass (g) of the film forming stock solution and Wb denotes the mass (g) of the film forming stock solution after Wa (g) of the solution is dried in an electric heat drier at 105° C. for 16 hours.)

Examples of the method of adjusting the film forming stock solution in the present invention include, but not particularly limited to, a method where PVA and the additives, such as a plasticizer and a surfactant, are dissolved in a dissolution tank or the like, a method where PVA in a hydrated state is melt kneaded together with a plasticizer, a surfactant, a nucleating agent, and the like, using a single- or twin-screw extruder, and the like.

In the present invention, as the filter used to control the content of the nucleating agent to be the crystalline nucleus, metal mesh, metal fabric, and the like with an average aperture from 10 to 150 μm are preferably used. Use of a filter with an aperture of less than 10 μm is likely to cause filter clogging, and thus causes difficulty in stable operation for a long time as well as an excessively low content of the nucleating agent, leading to a risk of causing an excessively low degree of crystallization and an excessively large crystallite size. Meanwhile, use of a filter with an aperture of more than 150 μm is likely to cause film surface defects, such as gels, on the film and also causes an excessively high content of the nucleating agent, having a risk of a too high degree of crystallization and a too small crystallite size.

The surface temperature of the support for casting of the film forming stock solution from a T die or the like on a support, such as a metal roll and a metal belt, is preferably from 50° C. to 110° C. A surface temperature of less than 50° C. causes slow drying and has a risk of causing an excessively high degree of crystallization and an excessively large crystallite size and also increases the time taken for drying and has a risk of reducing the productivity. A surface temperature of more than 110° C. tends to cause irregularities on the film surface, such as foaming, and causes an increase in the amorphous component due to rapid drying and has a risk of causing a too small degree of crystallization. From the perspective of facilitating regulation of the degree of crystallization and the crystallite size, the surface temperature is preferably from 60° C. to 105° C. and more preferably from 65° C. to 100° C.

Simultaneously with heating of the PVA film on the support, hot air at a wind velocity from 1 to 10 m/second may be uniformly blown on the entire region on a non-contact surface side of the PVA film to regulate the drying rate. The temperature of the hot air blown on the non-contact surface side is preferably from 50° C. to 150° C. and more preferably from 70° C. to 120° C. from the perspective of efficiency and uniformity of drying and the like. In the case of the temperature of the hot air of more than 150° C., irregularities on the film surface, such as foaming, tends to occur. In this case, drying rapidly proceeds and causes an excessive increase in the amorphous component, which has a risk of causing an excessively small degree of crystallization. Meanwhile, in the case of the temperature of the hot air of less than 50° C., drying slowly proceeds and has a risk of causing an excessively high degree of crystallization and an excessively large crystallite size. In this case, there is also a risk of increasing the time taken for drying and reducing the productivity. A wind velocity of more than 10 m/second has a risk of causing surface irregularities, such as a wave pattern, on the surface of the film forming stock solution. Meanwhile, a wind velocity of less than 1 m/second causes steady unevenness of the wind velocity, such as convective cells, on the surface of the film forming stock solution and has a risk of causing uneven drying.

The film released from the support is preferably dried to a ratio of volatile components from 5 to 50 mass % on the support and then released, and further dried as needed. Examples of the drying method include, but not particularly limited to, a method including contacting a drying furnace and a drying roll. In the case of drying with a plurality of drying rolls, it is preferred that one surface and the other surface of the film alternately contact the drying rolls for homogenization of both surfaces. The number of drying rolls is preferably three or more, more preferably four or more, and even more preferably from 5 to 30. The temperature of the drying furnace or the drying roll(s) is preferably 40° C. or more and 110° C. or less. The upper limit of the temperature of the drying furnace or the drying roll(s) is more preferably 100° C. or less, more preferably 90° C. or less, and even more preferably 85° C. or less. An excessively high temperature of the drying furnace or the drying roll(s) has a risk of causing a too high degree of crystallization and an excessively large size of crystals. Meanwhile, the lower limit of the temperature of the drying furnace or the drying roll(s) is more preferably 45° C. or more and even more preferably 50° C. or more. An excessively low temperature of the drying furnace or the drying roll(s) has a risk of causing an excessive increase in the amorphous portion.

The PVA film may further be heat treated as needed. The heat treatment allows adjustment of strength, water solubility, and index of double refraction, and the like of the film. The temperature of the heat treatment is preferably 60° C. or more and 135° C. or less. The upper limit of the heat treatment temperature is more preferably 130° C. or less. An excessively high heat treatment temperature causes a too large amount of heat to be provided and has a risk of causing a too high degree of crystallization and an excessively large size of crystals.

The water-soluble film thus produced is subjected to further humidity control, cutting of both edges (trimmings) of the film, and the like as needed, and then wound in a roll on a cylindrical core and moistureproof packaged to be a product.

The ratio of volatile components in the PVA film finally obtained through the series of treatment described above is preferably, but not particularly limited to, from 1 to 5 mass % and more preferably from 2 to 4 mass %.

Applications

The water-soluble film of the present invention has excellent balance between the water solubility and the mechanical strength and may be preferably used in various water-soluble film applications. Examples of such a water-soluble film include packaging films for chemicals, base films for hydraulic transfer printing, base films for embroidery, mold release films for artificial marble molding, packaging films for seeds, films for sanitary container bags, and the like. Among them, the water-soluble film of the present invention is preferably used as the packaging films for chemicals to obtain even marked effects of the present invention.

In the case of applying the water-soluble film of the present invention to packaging films for chemicals, examples of the kind of chemical include pesticides, detergents (including bleaches), disinfectants, and the like. The properties of the chemicals are not particularly limited and may be acidic, neutral, or alkaline. The chemicals may contain a boron-containing compound. The form of the chemicals may be in any of powder, bulk, gel, and liquid. The chemical may contain a boron-containing compound and a halogen-containing compound. The form of package is preferably, but not particularly limited to, unit packaging to package (preferably, seal package) the chemicals per unit amount. A package of the present invention is obtained by packaging a chemical by using the film of the present invention as a packaging film for chemicals.

EXAMPLES

Although the present invention is specifically described below by way of Examples and the like, the present invention is not at all limited by Examples below. It should be noted that evaluation items and methods thereof employed in Examples and Comparative Examples below were as follows.

(1) Wide-Angle X-Ray Diffraction (WAXD) Measurement Conditions and Quantification of Degree of Crystallization and Crystallite Size The water-soluble film was cut in size of approximately 10 mm×5 mm and four of such a film were overlaid in an arrangement for X-ray incidence by a transmission method. At this point, the film was set up to place the MD direction longitudinally. Each sample was measured under the measurement conditions below.

Measurement Apparatus: D8 Discover with GADDS manufactured by Bruker Corp.
Detector: Two-Dimensional PSPC Hi-STAR
X-ray Source: Cu
Current: 110 mA
Voltage: 45 kV
Exposure Time: 20 Minutes
Collimator Diameter: 0.3 mm
Camera Length: 15 cm
Detector Position ($2\theta$): 22°
Sample Position ($\omega$): 11°
Tilt Angle ($\chi$): 90°, 0°
Chi Conversion: Sector Integral Transform
Measurement Range: $2\theta$=4.5° to 38°, Chi=−135 to −45°, Step Width: 0.02°

Crystallization degree analysis data was prepared by adding two-dimensional image data at the tilt angles ($\chi$)=90° and 0° to be used as an analysis profile.

Measurement Temperature: Room Temperature (Approximately 25° C.)

From the X-ray profile thus obtained, fitting was performed by the above method to quantitate the degree of crystallization and the crystallite size of the film.

(2) Haze

From the water-soluble film, a transversely long sample in strip with 15 cm in the film formation flow direction (hereinafter, may be abbreviated as "MD") and the full width in the film width direction (hereinafter, may be abbreviated as "TD") was collected. This sample was further cut in each width of 50 cm in TD. In the case that the finally left film at the edge was less than 50 cm, it was subjected to the measurement with the original width.

In the sample pieces thus obtained with a width of 50 cm, five spots were randomly selected from above to measure the total haze at the spots using haze meter HZ-1 manufactured by Suga Test Instruments Co., Ltd. in accordance with ASTM D1003-61. The total haze was thus measured at ten spots per width of 1 m.

An average value of all the measured total hazes was defined as the total haze of the water-soluble film.

Then, on both surfaces of the film at the same spots where the total haze was measured, a clear cellophane adhesive tape (CT405AP produced by Nichiban Co., Ltd.) was bonded to allow no bubbles to enter, thereby flattening the uneven shape on the surface to measure the haze in the same manner as the total haze in a state of not affected by the haze derived from the surface shape. Moreover, the haze of two cellophane adhesive tapes only bonded to each other on the adhesive surfaces was measured as a blank value, and a value obtained by subtracting the blank value from the haze of the water-soluble film with the cellophane adhesive tapes bonded on both surfaces was defined as the internal haze at the spot. In the same manner as the total haze, an average value of the measurements at all the spots was defined as the internal haze of the water-soluble film.

At each measurement spot, a value obtained by subtracting the internal haze from the total haze was defined as the external haze at the spot, and an average value of these values was defined as the external haze of the film.

(3) Visibility of Film Contents

A steel plate with a thickness of 1 mm having an open window of 10 cm×10 cm was prepared, and the water-soluble PVA film cut in size of 11 cm×11 cm was bonded to the area of the window using a double-sided adhesive tape not to be crinkled. Then, on newspaper laid on a plane, the steel plate with the water-soluble film bonded thereto was placed to cause the water-soluble film in contact with the newspaper (to direct the water-soluble film bonded side downward) and whether an article on the newspaper was legible was evaluated to evaluate the visibility of the contents.

Evaluation Criteria:
A: The transparency was good and the article was readily legible.
B: The film was slightly turbid but the article was legible with no problem.
C: The film was seen blurred and it was difficult to read complex Chinese characters and the like.

(4) Sticking of Film

The water-soluble film was cut into 3 cm×20 cm and rolled about a shorter side into a cylindrical shape with an inner diameter of approximately 1 cm and then both edges were cut. A small roll of the water-soluble film with an inner diameter of 1 cm and a width of 1 cm was thus prepared. Using wide binder clips with a width of 15 mm (trade name Scel-bo manufactured by KOKUYO Co., Ltd.), the area around the central axis of the roll thus obtained was fastened to put the direction of the fastening portions of the clips coinciding with the axial direction of the roll and stored for 16 hours under the conditions of 60° C.-90% RH. The film roll after storage was unwound to evaluate the state of stick of the contact surfaces at the edges.

Evaluation Criteria:
A: The contact surfaces did not stick together at the edges and the water-soluble film was unwound with no resistance.
B: A resistance was sensed during unwinding, but it was possible to unwind the water-soluble film by applying force.
C: The contact surfaces stuck together at the edges and it was not possible to unwind the water-soluble film.

(5) Solubility of Water-Soluble Film

The solubility of the water-soluble film was evaluated by the method below.
<1> The water-soluble film was left in a thermohygrostat conditioned at 20° C.-65% RH for 16 hours or more for humidity control.

<2> A rectangular sample with a length of 40 mm×a width of 35 mm was cut from the humidity controlled water-soluble film and then sandwiched for fixation between two 50 mm×50 mm plastic plates having a rectangular window (hole) with a length of 35 mm×a width 23 mm in a position where the longitudinal direction of the sample was parallel to the longitudinal direction of the window and the sample was approximately at the center in the window width direction.

<3> In a 500 mL beaker, 300 mL of deionized water was put and the water temperature was adjusted at 10° C. while stirring with a magnetic stirrer having a bar with a length of 3 cm at the number of revolutions of 280 rpm.

<4> The sample fixed to the plastic plates in <2> above was immersed in the deionized water in the beaker with attention not to contact the bar of the magnetic stirrer.

<5> The complete dissolution time (second) from the immersion in the deionized water to complete disappearance of the sample pieces dispersed in the deionized water was measured.

Evaluation Criteria:
A: The complete dissolution time was less than 60 seconds. The solubility was very good.
B: The complete dissolution time was 60 seconds or more and less than 600 seconds. The solubility was good.
C: The complete dissolution time was 600 seconds or more. The solubility was poor.

Example 1

A film forming stock solution having a ratio of volatile components of 60 mass % was prepared that was composed of 100 parts by mass of maleic acid monomethyl ester (hereinafter, may be abbreviated to as MMM) modified PVA (degree of saponification of 91 mol %, degree of polymerization of 1700, amount of MMM modification of 2 mol %) obtained by saponifying polyvinyl acetate, 25 parts by mass of glycerin as the plasticizer, 2.0 parts by mass of lauric acid diethanolamide as the surfactant, and water. At this point, the stock solution was filtered using two metal screen mesh filters of 200 mesh (aperture of 75 µm) and discharged in the form of film from a T die on a first drying roll (surface temperature of 80° C.), and hot air at 85° C. was blown for drying on the entire non-contact surface relative to the first drying roll at a rate of 5 m/second on the first drying roll, and then the water-soluble PVA film was released from the first drying roll when the moisture content of the film was reduced to 24 mass %. The film was further dried on second and later drying rolls at a roll surface temperature of approximately 75° C. in such a manner that one surface and the other surface of the PVA film alternately contacted the respective drying rolls and then was thermally embossed to provide the maximum height difference of approximately 4.0 µm and arithmetic mean roughness on the surface of approximately 1.5 µm, and the film was wound on a cylindrical core to obtain a roll of a water-soluble PVA film (thickness of 35 µm and width of 1200 mm).

The film thus obtained was subjected to measurement of the crystallite size and the degree of crystallization, resulting in 4.9 nm of the crystallite size and 18.2% of the degree of crystallization. The total haze of the film was 48.3%, the internal haze was 30.5%, and the visibility of the film contents was evaluated as A. In the stickiness evaluation of the film thus obtained, no sticking was found and the water-soluble film was unwound with no resistance and thus evaluated as A.

Examples 2 and 3 and Comparative Examples 5 and 6

PVA films were obtained in the same manner as in Example 1 except for changing the amount of glycerin to be added to 10, 30, 40, and 5 parts by mass, respectively.

Examples 4 and 5

Water-soluble PVA films were obtained in the same manner as in Example 1 except for using, as the PVA, unmodified PVA (degree of saponification of 88 mol %, degree of polymerization of 1700) and acrylamide-2-methylpropanesulfonic acid sodium salt (AMPS) modified PVA (degree of saponification of 88 mol %, degree of polymerization of 1700, amount of AMPS modification of 2 mol %), respectively.

Example 6

A water-soluble PVA film was obtained in the same manner as in Example 1 except for changing the embossing conditions to the maximum height difference of approximately 1 µm and the arithmetic mean roughness Ra on the surface of approximately 1.0 µm.

Example 7

A water-soluble PVA film was obtained in the same manner as in Example 1 except for using a PVA stock solution to which 2 parts by mass of silica particles having an average particle diameter of approximately 2 µm was added as a nucleating agent for crystallization instead of applying embossing.

Comparative Example 1

A water-soluble PVA film was obtained in the same manner as in Example 1 except for setting up five metal mesh filters.

Comparative Example 2

A water-soluble PVA film was obtained in the same manner as in Comparative Example 1 except for not applying embossing.

Comparative Example 3

A water-soluble PVA film was obtained in the same manner as in Example 1 except for using no metal mesh filters.

Comparative Example 4

A water-soluble PVA film was obtained in the same manner as in Comparative Example 3 except for using a PVA stock solution to which 6 parts by mass of silica particles having an average particle diameter of approximately 2 µm was added as a nucleating agent for crystallization instead of applying embossing.

Comparative Example 7

A water-soluble PVA film was obtained in the same manner as in Example 1 except for providing the temperature of a first drying roll at 90° C. and the temperature of a second drying roll at 70° C.

The evaluation results of the films thus obtained are shown in Table 1.

internal haze is obtained by measuring haze of an adhesive-bonded water-soluble film in accordance with ASTM D1003-61.

2. The water-soluble film according to claim 1, wherein the total haze is 55.0% or less.

3. The water-soluble film according to claim 2, wherein the internal haze is 35.0% or less.

TABLE 1

| | Example 1 | Example 2 | Example 3 | Example 4 | Example 5 | Example 6 | Example 7 | Comparative Example 1 |
|---|---|---|---|---|---|---|---|---|
| Modification | MMM Δ2 | MMM Δ2 | MMM Δ2 | Unmodified | AMPS Δ2 | MMM Δ2 | MMM Δ2 | MMM Δ2 |
| Degree of Saponification [mol %] | 91 | 91 | 91 | 88 | 88 | 91 | 91 | 91 |
| Amount of Plasticizer [mass %/PVA] | 25 | 10 | 30 | 25 | 25 | 25 | 25 | 25 |
| Amount of Added Silica Particles [mass %/PVA] | 0 | 0 | 0 | 0 | 0 | 0 | 2 | 0 |
| Embossing | Large | Large | Large | Large | Large | Small | — | Large |
| Number of Filter | 2 | 2 | 2 | 2 | 2 | 2 | 2 | 5 |
| Crystallite Size [nm] | 4.9 | 5.0 | 4.2 | 4.3 | 4.8 | 4.8 | 4.4 | 6.0 |
| Degree of Crystallization [%] | 18.2 | 22.3 | 12.5 | 23.6 | 18.3 | 18.3 | 19.4 | 20.3 |
| Total HAZE [%] | 48.3 | 50.2 | 45.8 | 40.9 | 43.2 | 40.3 | 50.4 | 60.5 |
| Internal HAZE [%] | 30.5 | 35.5 | 28.6 | 30.1 | 33.3 | 28.3 | 25.6 | 50.8 |
| External HAZE [%] | 17.8 | 14.7 | 17.2 | 10.8 | 9.9 | 12.0 | 24.8 | 9.7 |
| Transparency Evaluation | A | B | A | A | A | A | B | C |
| Stickiness Evaluation | A | A | A | A | A | A | A | A |
| Solubility | A | A | A | A | A | A | A | A |

| | Comparative Example 2 | Comparative Example 3 | Comparative Example 4 | Comparative Example 5 | Comparative Example 6 | Comparative Example 7 |
|---|---|---|---|---|---|---|
| Modification | MMM Δ2 | MMM Δ2 | MMM Δ2 | MMM Δ2 | MMM Δ2 | MMM Δ2 |
| Degree of Saponification [mol %] | 91 | 91 | 91 | 91 | 91 | 91 |
| Amount of Plasticizer [mass %/PVA] | 25 | 25 | 25 | 40 | 5 | 25 |
| Amount of Added Silica Particles [mass %/PVA] | 0 | 0 | 6 | 0 | 0 | 0 |
| Embossing | — | Large | — | Large | Large | Large |
| Number of Filter | 5 | 0 | 0 | 2 | 2 | 2 |
| Crystallite Size [nm] | 6.4 | 2.2 | 2.5 | 4.0 | 6.3 | 2.8 |
| Degree of Crystallization [%] | 20.6 | 10.5 | 23.1 | 8.3 | 33.8 | 9.9 |
| Total HAZE [%] | 40.6 | 42.3 | 60.4 | 40.8 | 60.4 | 42.6 |
| Internal HAZE [%] | 38.4 | 29.5 | 58.5 | 35.4 | 50.9 | 29.6 |
| External HAZE [%] | 2.1 | 12.8 | 1.9 | 5.4 | 9.6 | 12.9 |
| Transparency Evaluation | A | A | C | A | C | A |
| Stickiness Evaluation | C | C | B | C | A | C |
| Solubility | A | A | A | A | C | A |

As clearly seen from Table 1, the water-soluble film of the present invention was excellent in transparency and also excellent in the effect of inhibiting sticking. Use of the water-soluble film of the present invention for a package to contain a chemical and the like allows a package to be obtained to be excellent in visibility and to suppress deformation and tear during storage or transport.

The invention claimed is:

1. A water-soluble film comprising a polyvinyl alcohol resin, wherein
a crystallite size obtained from an X-ray profile obtained by wide-angle X-ray measurement is from 4.0 to 5.5 nm and a degree of crystallization obtained from the X-ray profile is from 10.0% to 25.0%, and
an external haze is from 7.0% to 30.0%, wherein the external haze is obtained by subtracting an internal haze from a total haze, in which the total haze is measured in accordance with ASTM D1003-61, and the 4. The water-soluble film according to claim 1, further comprising a plasticizer, wherein
a content of the plasticizer is from 8 to 35 parts by mass based on 100 parts by mass of the polyvinyl alcohol resin.

5. A package comprising: the water-soluble film according to claim 1 and a chemical contained in the water-soluble film.

6. The package according to claim 5, wherein the chemical is a pesticide, a detergent, or a germicide.

7. The package according to claim 5, wherein the chemical is in a liquid form.

8. The water-soluble film according to claim 1, wherein the polyvinyl alcohol resin consists of an unmodified polyvinyl alcohol.

9. The water-soluble film according to claim 1, wherein the polyvinyl alcohol resin has a degree of polymerization of 500 to 3,000.

10. The water-soluble film according to claim 1, wherein the polyvinyl alcohol resin has a degree of saponification of 75 to 97 mol %.

11. The water-soluble film according to claim 1, wherein the polyvinyl alcohol resin includes at least one selected from unmodified polyvinyl alcohol, an acrylamide-2-methylpropanesulfonic acid sodium salt (AMPS) modified polyvinyl alcohol, and a maleic acid monomethyl ester (MMM) modified polyvinyl alcohol.

12. The water-soluble film according to claim 1, wherein the water-soluble film comprises a single polyvinyl alcohol resin or two or more polyvinyl alcohol resins having a degree of polymerization, a degree of saponification, and/or a degree of modification different from each other.

13. The water-soluble film according to claim 12, wherein the water-soluble film comprises the single polyvinyl alcohol resin, and the single polyvinyl alcohol resin is a maleic acid monomethyl ester (MMM) modified polyvinyl alcohol.

14. The water-soluble film according to claim 12, wherein the water-soluble film comprises the single polyvinyl alcohol resin, and the single polyvinyl alcohol resin is an acrylamide-2-methylpropanesulfonic acid sodium salt (AMPS) modified polyvinyl alcohol.

15. The water-soluble film according to claim 4, wherein the plasticizer includes glycerin.

16. The water-soluble film according to claim 15, further comprising lauric acid diethanolamide.

17. The water-soluble film according to claim 1, wherein the water-soluble film is formed by a process that includes discharging a stock solution including the polyvinyl alcohol resin on a drying roll having a surface temperature of 65° C. to 80° C.

18. The water-soluble film according to claim 17, wherein the process further includes blowing air at a temperature of 70° C. to 120° C. and at a wind velocity of 1 to 10 m/second during the discharging.

19. The water-soluble film according to claim 17, wherein the process further includes, before the discharging, filtering the stock solution.

20. The water-soluble film according to claim 19, wherein the stock solution is filtered by two metal screen mesh filters.

* * * * *